United States Patent [19]
Armstrong

[11] 3,850,805
[45] Nov. 26, 1974

[54] FILTER SYSTEMS

[75] Inventor: Allan Armstrong, Manchester, England

[73] Assignees: Sutcliffe, Speakman & Co., Ltd., Lancashire; Alan Pond Equipment Limited, Harlow, Essex, England

[22] Filed: June 21, 1972

[21] Appl. No.: 264,942

[30] Foreign Application Priority Data
June 23, 1971 Great Britain.................... 29435/71

[52] U.S. Cl................. 210/167, 210/184, 210/277, 210/284
[51] Int. Cl............................................. B01d 23/24
[58] Field of Search .......... 210/167, 195, 196, 184, 210/257–259, 277, 278, 284; 134/111

[56] References Cited
UNITED STATES PATENTS
660,563  10/1900  Davis ............................... 210/184
2,296,824  9/1942  Ashworth....................... 210/273 X
2,593,227  4/1952  Wagner.......................... 210/184 X
3,384,239  5/1968  Berardi.......................... 210/167 X
3,502,215  3/1970  Cahan............................... 210/167
3,550,778  12/1970  Kesselman ........................ 210/167
3,616,917  11/1971  Hellwege ......................... 210/167

Primary Examiner—John Adee
Attorney, Agent, or Firm—Woodhams, Blanchard and Flynn

[57] ABSTRACT

The invention relates to a filter and water reclamation system in which a filter bed comprising a filter element of activated carbon and a filter bed comprising a filter element of sand are connected in series so that solids, detergent and wax are removed from water cycled through the system.

4 Claims, 3 Drawing Figures

FILTER SYSTEMS

The invention relates to a filtering and water reclamation system.

It is an object of the invention to provide a system which may be utilised in the removal of detergents and wax from water used in car-washing or other equipment, such as an automatic car-wash, although it will be understood that the object may be achieved in other applications where detergent and/or wax is to be removed from water or other carrier.

It is another object of the invention to provide a filter and water reclamation system comprising in series tank means for receiving contaminated liquid to be filtered, pump means, filter bed means with inlet means and outlet means, filter element means in said filter bed means comprising a bed of activated carbon, and reservoir means, said foregoing means being connected by pipe means through which contaminated liquid from said tank means is cycled through said filter bed means from said inlet to said outlet means to said reservoir means whereby the liquid passing from said outlet means is substantially free of detergent and/or wax.

It is yet another object of the invention to provide a filter system which includes a second filter means upstream of the bed of activated carbon and capable of removing solids entrained in the liquid so that the activated carbon is not contaminated by the entrained solids.

According to another object, the invention also provides a car-washing installation incorporating a filter system of the kind hereinbefore described.

The said car-washing installation may includes means for adding new detergent or wax in controlled, predetermined quantities to the liquid which has passed through the system. The said system is therefore able to operate with a predetermined quantity of detergent and/or wax circulating therethrough, there being substantially no overloading of the said system. Moreover, the liquid, preferably water circulating in the installation may be maintained substantially constant and can be re-used an indefinite number of times. There is consequent saving in water and water costs.

These and other advantageous objects of the invention become readily apparent from reading the following description in conjunction with the accompanying drawings, which are purely diagrammatic and illustrate, by way of example only, one exemplary embodiment and in which.

Figure 1:
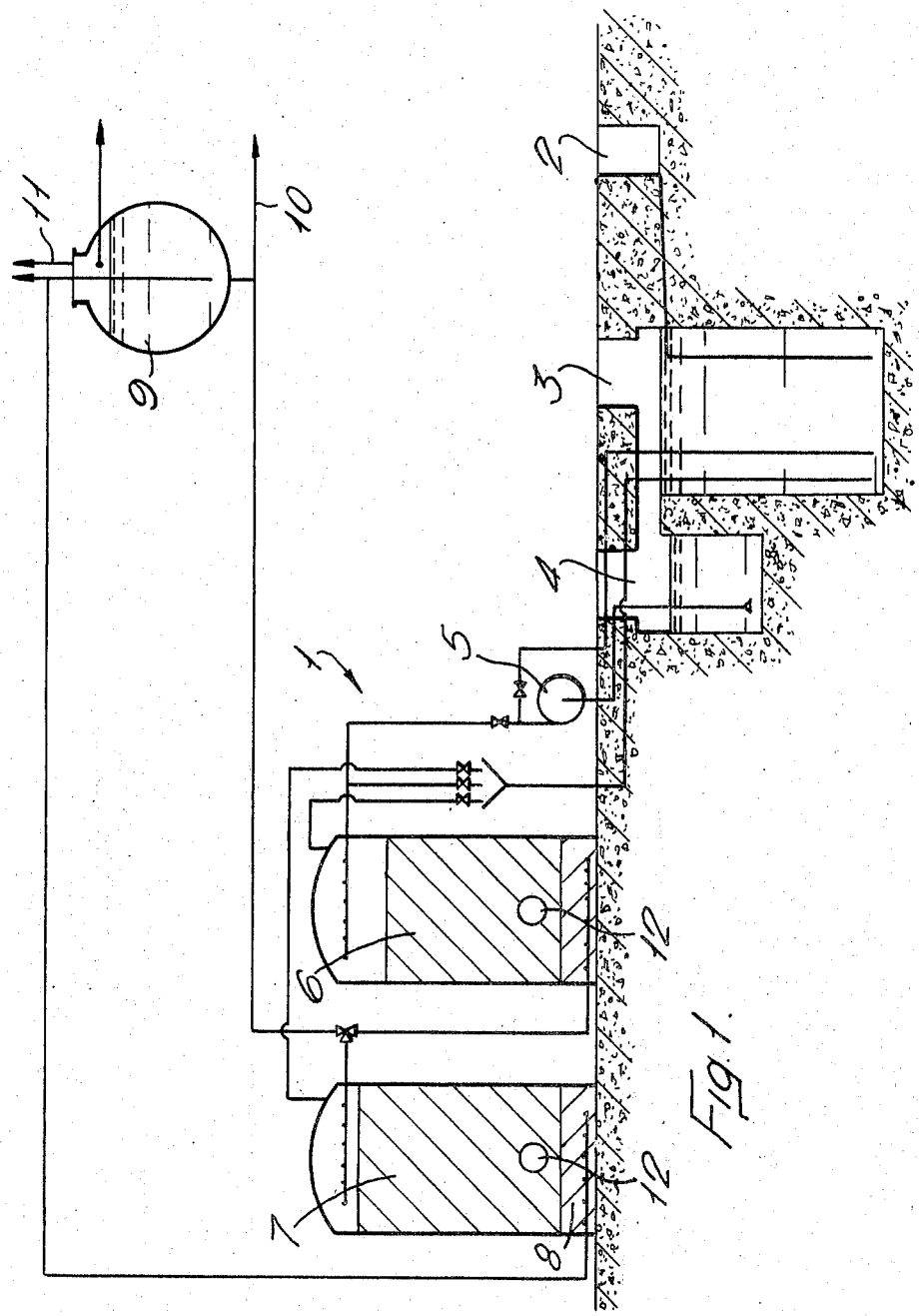
FIG. 1 shows a schematic lay-out of a filtering system.

Referring to the drawings, the filtering system 1 shown in FIG. 1 comprises in series a drain sump 2, settling tank 3, overflow or pumping tank 4, pump 5, a first filter bed 6 containing sand on a bed of graded gravel, a second filter bed 7 of activated carbon, and outlet 8 and a reservoir 9. The reservoir 9 has an outlet 10 and a vent 11, while each filter bed includes an electric heater 12 to overcome the problem of freezing during winter conditions.

The filtering system shown is used for filtering water from car washing equipment which contains grit, detergent and/or wax and drains from a washing bay into the drain sump 2.

The water passes from the drain sump to the settling tank 3, in which the major part of the solids in the water is removed by settling. The water overflows from the settling tank into the overflow tank 4, from where it is pumped by the pump 5 into the first filter bed 6 and passes through the sand or gravel therein, any grit being substantially removed in the process.

The substantially grit free water is then passed from the bottom of the first filter bed 6 into the top of the second filter bed 7, which contains activated carbon or charcoal.

Any detergent and/or wax entrained in the water is adsorbed onto the activated carbon during passage through the second bed. The water leaving the second bed at the outlet 8 is substantially pure and is passed through the car washing apparatus. Any excess decontaminated water can overflow into the sewage system without contamination thereof.

There is preferably provided a means (not shown) for the controlled addition of detergent and/or wax to the system to replace the detergent and/or wax removed in the filter bed. The system is therefore not overloaded with detergent or wax.

The electrical heaters 12 are operated selectively in cold weather to obviate freezing of the beds.

Figure 2:
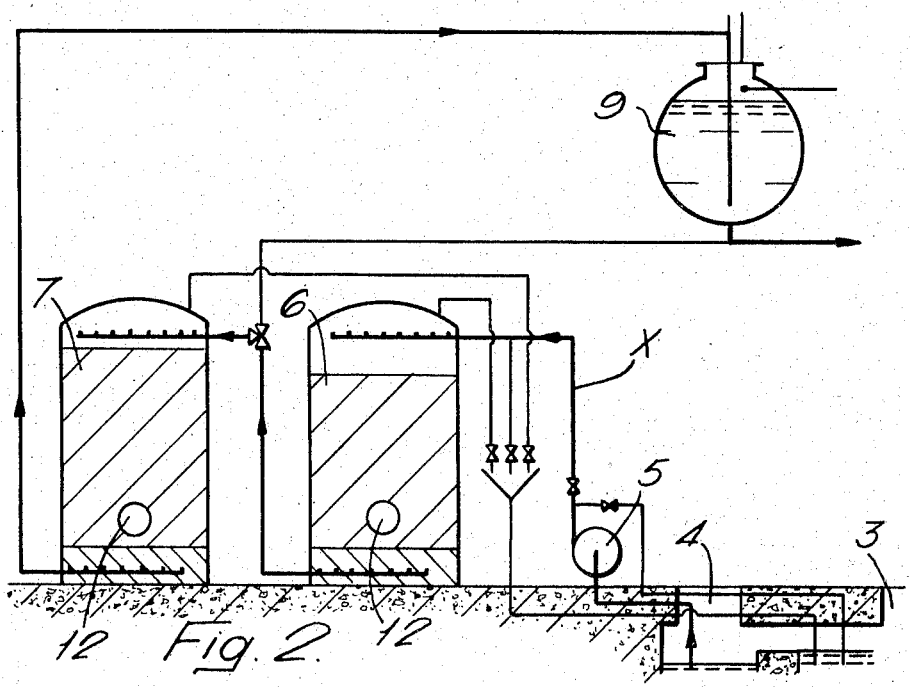
FIG. 2 shows part of the system of FIG. 1 showing water flow in a normal filtering sequence.
Figure 3:
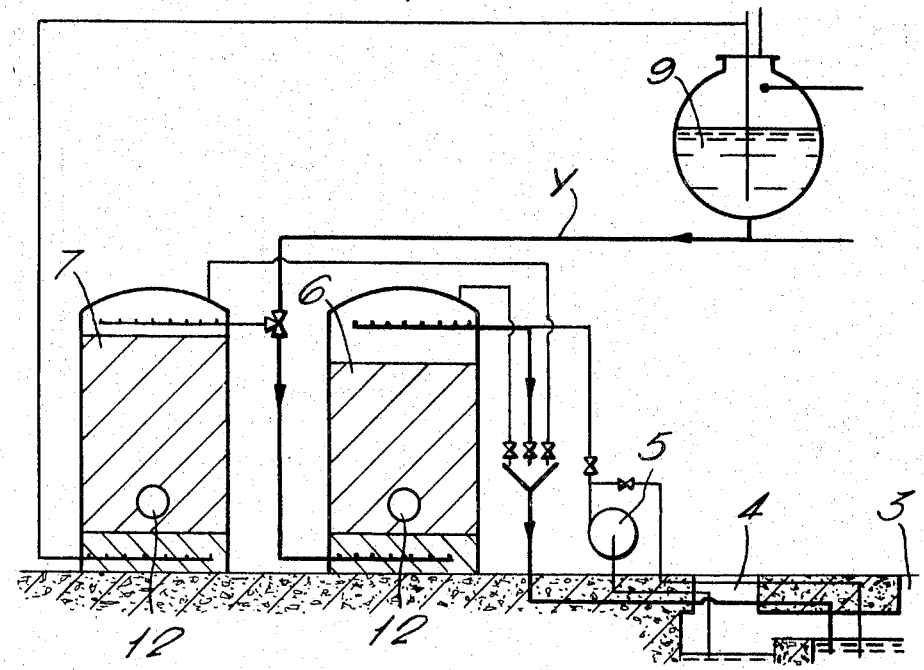
FIG. 3 shows part of the system of FIG. 1 showing water flow in a back-washing operation for the filters.

Direction of normal water flow through the system to de-contaminate water containing solids, wax and/or detergent is shown schematically by heavy line arrows 'X' in FIG. 2, while FIG. 3 shows the direction of flow from the reservoir during a cycle backwash and cleanse through the filter beds as shown in heavy lines and arrows 'Y.' The reclaimed water from the reservoir therefore effects back-washing.

Valves are indicated schematically on FIGS. 1 to 3 in the pipe lines for the water.

I claim:

1. A filter and water reclamation system for use with a washing apparatus, comprising tank means for receiving contaminated water to be filtered, pump means, first filter bed means with inlet and outlet means, filter element means in said first filter bed means comprising sand on a bed of graded gravel adapted to remove grit and other foreign bodies from said contaminated water, second filter bed means with inlet and outlet means, filter element means in said second filter bed means comprising a bed of activated carbon for removing detergent and/or wax from said contaminated water, reservoir means wherein clean water is collected after passage through said first and second filter means prior to passage to said washing apparatus, conduit means connecting said tank means, pump means, first and second filter bed means, and reservoir means in series for permitting contaminated water from said tank means to be cycled through said filter bed means to said reservoir means, and auxiliary conduit means connected between said reservoir means and the outlet means of said second filter bed means for permitting backwashing of said second filter bed means by means of the clean water contained within said reservoir means, whereby the water passing from said outlet means of said second filter means to said reservoir means is substantially clean of grit and other foreign bodies and free of detergent and/or wax.

2. A filter and water reclamation system as defined in claim 1, wherein there are two electrical heater means, one of said two electrical heater means being disposed in the base of said first filter bed means and the other of said electrical heater means being disposed in the base of said second filter bed means.

3. A filter and water reclamation system as defined in claim 1, wherein the filter element means associated with each filter bed means is disposed vertically above the respective outlet means whereby the water flows vertically downwardly through the filter element means associated with each filter bed means.

4. A filter and water reclamation system as defined in claim 1, wherein said tank means includes a settling tank to which is supplied the contaminated water to be filtered, and said tank means further including an overflow tank disposed in communication with the upper end of said settling tank for receiving therein the water which overflows from the settling tank so as to permit the heavy solids to be removed from the water within the settling tank, and said conduit means connecting said pump means to said overflow tank for permitting the contaminated water to be withdrawn therefrom by said pump means for supply to said first and second filter bed means.

* * * * *